United States Patent Office 3,358,413
Patented Dec. 19, 1967

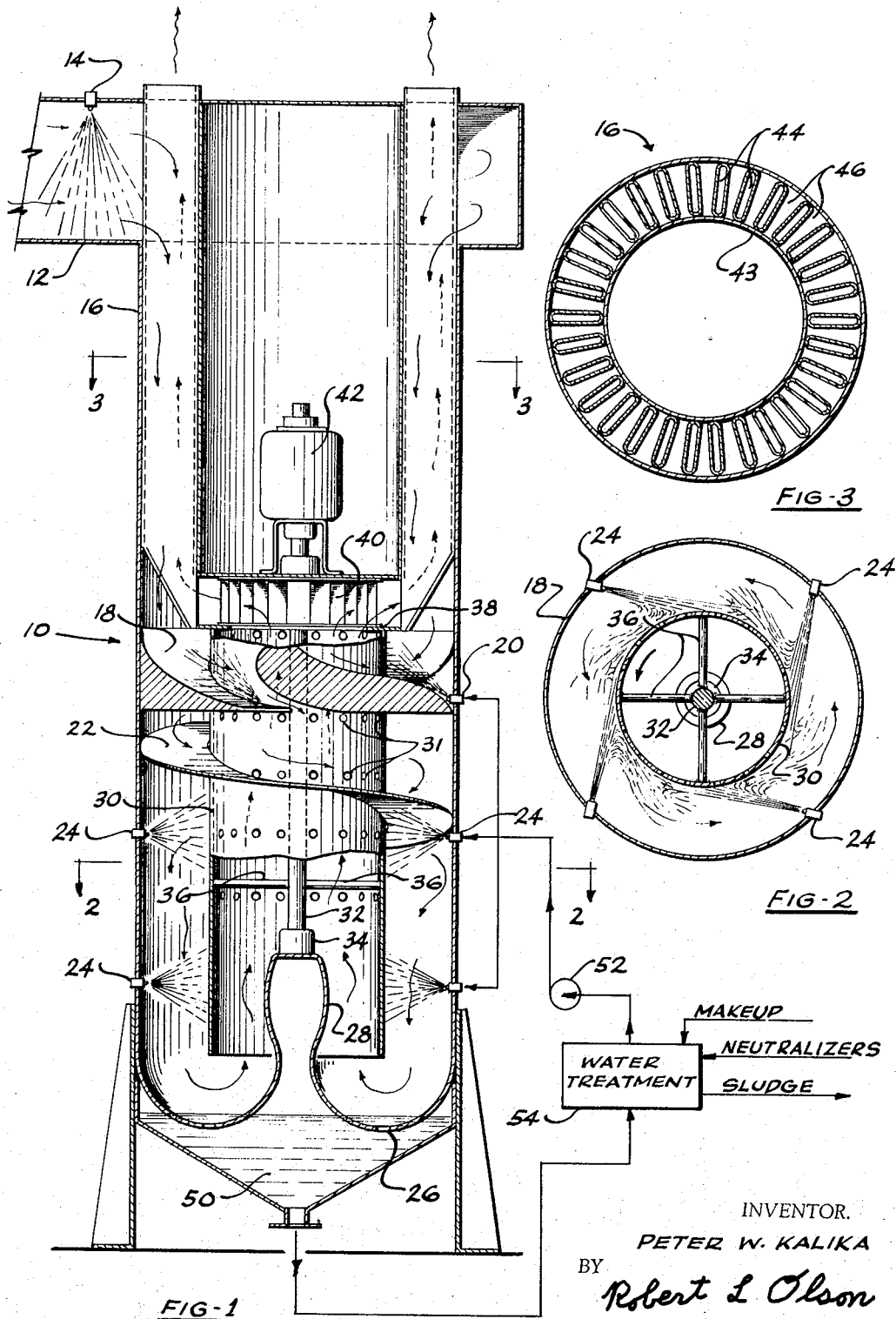

3,358,413
WET SCRUBBER FOR DIRTY GASES
Peter W. Kalika, Simsbury, Conn., assignor to Combustion Engineering, Inc., Windsor, Conn., a corportion of Delaware
Filed Dec. 28, 1966, Ser. No. 605,406
6 Claims. (Cl. 55—230)

ABSTRACT OF THE DISCLOSURE

A wet scrubber having an upright cylindrical housing in which is concentrically mounted a rotatable cylinder. The dust-laden gases enter the upper portion of the housing and flow spirally downward through a series of scrubbing zones in the annular space between the housing wall and the rotatable cylinder. The gases then reverse their direction and flow spirally upward within the rotatable cylinder. A vortex stabilizing bulb positioned in the lower portion of the rotatable cylinder ensures the spiral flow pattern of the gases up through the rotatable cylinder. The walls of the rotatable cylinder are perforated to aid in preventing captured liquid particles with entrained dust impurities from re-entering the scrubbed gases leaving the scrubber.

Background of the invention

The invention relates to a wet scrubber for removing impurities from hot dirty gases. Air pollution is a problem which is becoming of great concern to many people today. Many industries, especially where combustion processes are carried out, are looking for means whereby impurities in the hot combustion gases can be effectively and economically removed. Often means for cooling the gases must be simultaneously incorporated. These impurities can be the result of incomplete combustion of fuel, and/or foreign substances originally contained in the fuel. Problems are encountered in trying to remove these impurities because of the high temperature of the combustion gases, the large volume of gases that have to be handled, and the minute size of some of the impurities entrained in the combustion gases.

Summary of the invention

The wet scrubber of my invention utilizes a rotating cylinder upon which the scrubbing fluid is sprayed, thereby forming a finer spray capable of more efficiently entraining foreign particles. My invention further provides means for imparting a spin to the gases as they flow through the scrubber, thereby utilizing centrifugal force in helping to remove moisture droplets containing captured impurities from the gas stream.

Brief description of the drawings

FIGURE 1 is a cross-sectional side view of a wet scrubber constructed in accordance with the invention;
FIGURE 2 is a sectional view taken on lines 2—2 of FIGURE 1; and
FIGURE 3 is a sectional view taken on lines 3—3 of FIGURE 1.

Description of the preferred emodiment

Looking now to FIGURE 1 of the drawings, 10 designates a wet scrubber constructed in accordance with the invention. Hot dirty gases to be cleaned flow through duct 12 from a source, for example an incinerator (not shown). When these gases are at a very high temperature, for example near 2000° F., it is desirable to subject them to a spray quench by means of nozzle 14 positioned in the upper wall of duct 12.

These dirty gases then pass through annular heat exchanger 16, where their temperature is further reduced by giving up heat to the cleaned, relatively cool gases exiting from the wet scrubber. FIGURE 3 shows the construction of heat exchanger 16 which prevents intermingling of the hot dirty gases with the clean gas. The clean gas flows through passages 44, while the hot dirty gas flows through the annular passage 46, formed by the outer housing wall and inner wall means 43.

The dirty gases leaving heat exchanger 16 enter the wet scrubber 10 by way of a plurality of venturis 18. Nozzles 20 positioned in the venturi throats subject the dirty gases to a further liquid spray. The gases are further cooled and scrubbing is initiated in the venturis. The venturis 18 are positioned so as to introduce the gases tangentially into the annular space therebeneath. This causes the gases to enter the annular space in a spiral flow pattern. To further stabilize and ensure this spiral flow pattern, a spiral baffle 22 is located in the annular space.

The inner wall of the annular flow passage is formed by a cylindrical rotor 30, which is rotated by motor 42. The gases are subjected to further scrubbing by a plurality of spray nozzles 24. Nozzles 24 direct the sprays into the annular area in a direction counter to the gas flow, and rotational direction of the cylinder 30, as seen in FIGURE 2. The high relative velocity between the spiraling gas stream and the coarse sprays 24, results in a shredding of the water into fine droplets. Then as the sprays strike rotating rotor 30, they are thrown outwardly by centrifugal force, creating even finer droplets. The majority of scrubbing is done here, with dust particles captured by the water droplets. Upon reaching the lower portion of the housing, the spiraling gases encounter the concave, semi-toroidal reversing surface 26.

The gases then flow upwardly within the rotor 30, still spiraling past the vortex stabilizing bulb 28. This bulb stabilizes the centrifugal field and strengthens it by increasing the velocity of the spiraling gases. The entrained droplets of water are thrown to the inside wall of the rotor where they agglomerate and spread in a film. Some of this water runs down the rotor wall and is thrown off the lower edge. A large portion of it is thrown outwardly from the rotor 30 through holes or openings 31 therein.

The lower end of rotor 30 is supported and strengthened by shaft 32 and spokes 36. The lower end of shaft 32 is supported by the bulb 28, and is mounted in a suitable bearing 34. At the upper end of the rotor 30 an annular skimmer ring or lip 38 is provided, to prevent the water film on the inner surface of the rotor from being carried up into the fan 40.

The gas, now substantially free of dust and water, passes through the centrifugal fan 40, heat exchanger 16, and is exhausted to the atmosphere. The water that runs down the walls of the scrubber housing collects in a sump 50, and is pumped back up to the spray nozzles by pump 52. Openings are provided in the semi-toroidal member to allow the water to enter the sump. Water treatment apparatus 54 is used to remove the sludge and impurities from the cleaning water. Chemical neutralizers and makeup water may be added at this point.

The operation of the scrubber will now be described. Dust-laden gases enter the scrubber tangentially through the venturis, where they are subjected to a first liquid spray. The high velocity gas flow through these venturis aids the sprays in breaking up into smaller droplets, thus causing faster and more efficient cooling of the gases. The gas, with some of its particulate matter now captured by droplets of water, continues spirally downward into the annulus between the housing and the rotor. Here the gas encounters the second zone of scrubbing. Coarse fan-shaped sprays are directed toward the cylindrical rotor. The high relative velocity between the spiraling gas stream and the coarse sprays 24, results in a shredding of the water into fine droplets, and the impact of the sprays with the rotating surface generates an even finer droplet spray. Particulate matter is removed by impaction on droplets, and experience has shown that the finer the droplets, the greater the probability of impaction. Small droplets from the venturis are captured by larger droplets and some of these are centrifuged to the housing wall by cyclonic action. The particulate-laden water then runs down the walls of the housing into the sump.

The gas, solid particles, and droplets continue to spiral down the length of the rotor, encountering additional scrubbing spray, until the concave, semi-toroidal reversing surface is encountered. This surface smoothly reverses the direction of the vortex or spiral flow and passes it under the edge of the rotor with a minimum of spiral flow loss. The gas, entrained droplets, and remaining fine particulate matter now enter the inside of the rotor where the vortex stabilizing bulb is encountered. This bulb stabilizes the centrifugal field and strengthens it by increasing the velocity of the spiraling gases. The entrained droplets are thrown to the inside wall of the rotor where they are captured, agglomerate and spread in a film over the inside of the rotor. In passing transversely through the spiraling gas stream, these droplets provide one more opportunity for capturing fine dust. This section of the scrubber constitutes what is commonly referred to as the "Mist Eliminator," that is, the area where the entrained water droplets are removed before further processing. This invention is more effective than usual practice because of the high centrifugal field developed inside the rotor. At the upper end of the rotor the skimmer ring intercepts any droplets in the periphery of the spiraling gas which may otherwise be carried into the fan. Some of the accumulated water runs down the inside of the rotor to be thrown off at the bottom edge to form a "curtain" scrubbing zone between the rotor and the housing. Another portion of the water is thrown outwardly from the rotor through the openings therein.

The gas, now substantially free of dust and water droplets, passes through the centrifugal fan and the heat exchanger before being exhausted to the atmosphere.

Having now described my invention, what I claim is:

1. In a wet scrubber for removing impurities from dirty gases, an upright, cylindrical housing, a rotatable cylinder mounted in concentric relationship within the housing, thus forming an annular flow passage between the housing and cylinder, inlet means in the upper portion of the housing through which dirty gases enter, venturi means in the upper portion of the annular flow passage, the openings in the venturi means being located so as to cause the dirty gases flowing therethrough to move in a spiral direction down through the annular flow passage, first spray means for spraying a liquid into the openings in the venturi means, second spray means for spraying a liquid into the annular flow passage beneath the venturi means, flow directing means positioned in the lower portion of the housing for causing the downwardly flowing gases to reverse their direction and enter the space within the rotatable cylinder, vortex means positioned centrally within the rotatable cylinder, said vortex means having an upper bulb-shaped portion, and outlet means in the upper portion of the rotatable cylinder through which clean gases are discharged.

2. The wet scrubber set forth in claim 1, wherein the rotating cylinder has a plurality of holes therein.

3. The wet scrubber set forth in claim 2, wherein the second spray means are positioned on the housing, so as to direct the liquid spray inwardly toward the rotating cylinder.

4. The wet scrubber set forth in claim 3, including annular lip means extending inwardly from the upper edge of the rotating cylinder.

5. In a wet scrubber for removing impurities from dirty gases, an upright, cylindrical housing, a cylinder mounted in concentric relationship within the housing, thus forming an annular flow passage between the housing and cylinder, inlet means in the upper portion of the housing through which dirty gases enter, the inlet means being positioned such that the dirty gases enter the annular flow passage tangentially, causing them to flow in a spiral manner down through the annular flow passage, spray means for spraying a liquid into the annular flow passage, flow directing means positioned in the lower portion of the housing for causing the downwardly flowing gases to reverse their direction and enter the space within the cylinder, vortex means positioned centrally within the cylinder, said vortex means having an upper bulb-shaped portion positioned centrally of the cylinder, and adjacent the lower edge of the cylinder, and outlet means in the upper portion of the cylinder through which clean gases are discharged.

6. The wet scrubber set forth in claim 5, wherein the cylinder has a plurality of holes therein.

References Cited

UNITED STATES PATENTS

| | | | |
|---|---|---|---|
| 710,605 | 10/1902 | Bryant et al. | |
| 1,484,078 | 2/1924 | Pilling | 261—90 |
| 2,473,672 | 6/1949 | Ziliotto | 261—79 |
| 2,684,232 | 7/1954 | Caldwell | 55—238 |
| 2,736,390 | 2/1956 | Wickland | 55—230 X |
| 2,807,450 | 9/1957 | Gordon | 55—238 X |
| 2,889,005 | 6/1959 | Umbricht | 55—249 X |
| 3,031,825 | 5/1962 | Fourniere | 55—239 X |
| 3,199,267 | 8/1965 | Hausberg. | |

FOREIGN PATENTS

| | | |
|---|---|---|
| 1,185,499 | 2/1959 | France. |
| 1,324,862 | 3/1963 | France. |

HARRY B. THORNTON, *Primary Examiner.*

TIM R. MILES, *Examiner.*